March 29, 1949.    H. P. WILLIAMS    2,465,411
RADIO NAVIGATIONAL SYSTEM
Filed July 7, 1945
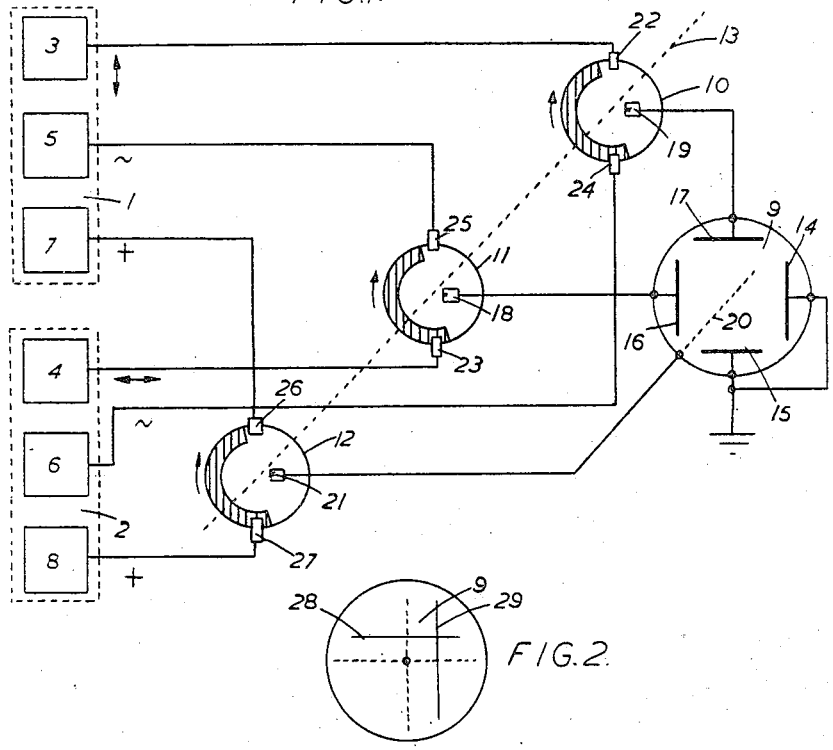
FIG.1.
FIG.2.
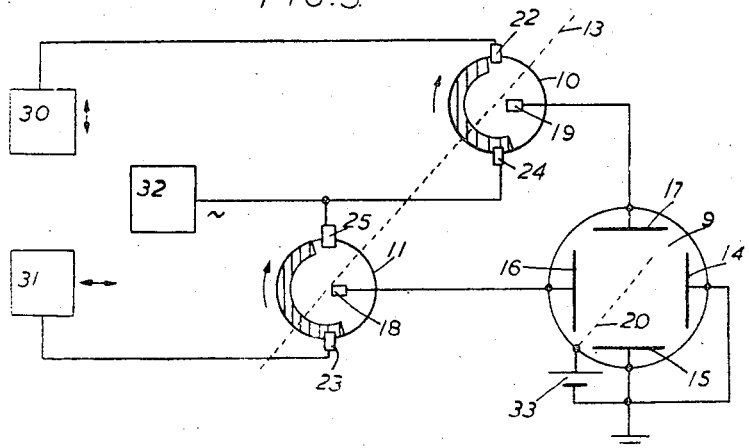
FIG.3.
*Inventor*
HERBERT PAUL WILLIAMS
*Attorney*

Patented Mar. 29, 1949

2,465,411

UNITED STATES PATENT OFFICE 2,465,411

RADIO NAVIGATIONAL SYSTEM

Herbert Paul Williams, London, England, assignor, by mesne assignments, to International Standard Electric Corporation, New York, N. Y., a corporation of Delaware Application July 7, 1945, Serial No. 603,642
In Great Britain June 27, 1944

Section 1, Public Law 690, August 8, 1946
Patent expires June 27, 1964

1 Claim. (Cl. 343—107)

The present invention relates to improvements in radio navigational systems of the kind which provide combined vertical and horizontal course indications.

It is now frequently the practice to provide means whereby a pilot navigating an aeroplane may make a safe landing under conditions of poor visability. There are a number of arrangements by which this may be done, and they usually involve a number of transmitters located on or near the landing ground which radiate beams of waves modulated by distinguishing signals. The aeroplane carries receiving apparatus which picks up these waves and includes means for deriving both horizontal and vertical indications as to the degree of departure of the aeroplane from the prescribed course. In some systems visual indications are provided, generally on two separate indicators, one giving the glide path or vertical indication, and the other the approach path or horizontal indication.

An arrangement has been proposed in which the two indicators comprise two current indicating instruments arranged in the same case with their pointers crossing over a common scale plate, and disposed so that when the pilot is on the prescribed course, the two pointers cross at right angles at the centre of the scale. When the aeroplane deviates from the course the pointers cross at some other part of the scale area and the pilot has to navigate the machine so that central crossing point is maintained. It is found, however, that the arrangement is difficult to read and follow because of the generally skewed effect of the pointers when they cross at some other point than the centre, and the skewness produces different sensitivities in the various quadrants.

The principal object of the present invention is to overcome this difficulty by the use of a single cathode ray tube indicator which replaces the two instruments with the crossed pointers. The glide path indication is given by a horizontal line trace on the oscillograph screen, which moves vertically up and down as the machine deviates from the glide path. The approach path indication is likewise given on the same screen by a vertical line trace which moves horizontally sideways as the machine moves off the approach path. When the machine is on the proper course, the two traces intersect at right-angles at the centre of the screen, and always remain at right angles for any deviations from the course. The arrangement is therefore much easier to follow and the indication is not obscured by a slanting effect such as is obtained with the crossed pointers.

The invention accordingly provides a receiving arrangement adapted to be caried by a landing aircraft for use with a combined radio glide path and approach path indicating system of the kind in which course indicating waves are radiated from ground transmitters, comprising a glide path receiver and an approach path receiver each adapted to derive from the said waves a control voltage depending on the departure of the aircraft from the corresponding path and also an alternating voltage, a cathode ray tube indicator, and means for applying the said receivers alternately to the tube for causing the corresponding control and alternating voltages jointly to control the deflections of the cathode beam in such a manner as to produce alternatly on the screen of the tube two line traces at right angles, the perpendicular distances of the said traces from the undeflected position of the beam spot indicating the departure from the said glide path and approach path, respectively.

According to a simplified variation of this arrangement. the alternating voltage is derived from a single source and is appropriately applied to the tube when the control voltage is applied from each receiver.

The invention will be explained with reference to the accompanying drawing, in which Fig. 1 shows a schematic circuit diagram of the preferred form of the invention. Fig. 2 shows a diagram of the appearance of the indications obtained on the screen of the cathode ray tube, and Fig. 3 shows a simplified version of Fig. 1.

In the preferred arangement shown in Fig. 1, the dotted outlines 1 and 2 represent the glide path receiver and the approach path receiver, respectively, and each is preferably of the kind described in the specification of the co-pending application No. 596,144. filed May 28, 1945, except that the cathode ray tube or other indicator is omitted. These receivers comprise respectively discriminators 3 and 4 each of which derives from the indicating signals a deflecting voltage proportional to the deviation from the corresponding course, circuits 5 and 6 for deriving alternating time base voltages from the signals for spreading out the cathode ray spot into an indicating line trace. and circuits 7 and 8 for deriving bias voltages for the control grid of the cathode ray tube indicator. As explained in the above mentioned specification. the circuits 5, 6, 7 and 8 are provided as safeguards by which the pilot may be advised of the existence of a fault in the indicating system.

Thus a fault causing the disappearance of the time base voltage results in the indicating line being reduced to a point, or one which causes the disappearance of the biassing voltage results in the suppression of the cathode beam, so that in either case the pilot is made aware of the fault.

According to the present invention, a single cathode ray tube 9 is provided and is shared between the two receivers 1 and 2, being connected alternately thereto by a commutator shown diagrammatically as comprising three contact discs 10, 11 and 12 keyed to a common driving shaft represented by the dotted line 13.

Each of these discs comprises a plain metal disc having a semi-annular insulating strip occupying a circumferential shaded area as indicated in the figure. A pair of diametrically opposed brushes ride on the surface at the edge of each disc so as to be alternately insulated as the disc rotates by riding on to the insulating strip. A third or central brush rides on the surface near the centre clear of the insulating strip, (or on the back of the disc) so as to be in permanent electrical contact with the disc. It will thus be seen that as the disc rotates the third brush will be connected alternately to each of the other brushes.

The cathode ray tube 9 has the $X_1$ and $Y_1$ plates 14 and 15 connected to earth, and the $X_2$ and $Y_2$ plates 16 and 17 respectively to the central brushes 18 and 19 of the discs 11 and 10. A control grid 20 of the tube 9 is connected to the central brush 21 of the disc 12.

The discriminators 3 and 4 are connected respectively to the upper brush 22 of the disc 10 and to the lower brush 23 of the disc 11, the time base circuits 5 and 6 are respectively connected to the upper brush 25 of the disc 11 and to the lower brush 24 of the disc 10. The biassing circuits 7 and 8 are connected respectively to the upper and lower brushes 26 and 27 of the disc 12.

It will be seen that when the commutator discs are in the position shown, the brushes 23, 24 and 27 are all insulated, so that the approach path receiver 2 is completely disconnected from the cathode ray tube.

A suitable polarising voltage is applied from the bias circuit 7 through the brushes 26 and 21 to the control grid 20 to release the cathode beam, which is normally suppressed. A horizontal time base alternating voltage is applied from the circuit 5 through the brushes 25 and 18 to the $X_2$ plate 16 producing a horizontal trace 28 on the oscillograph screen, as shown in Fig. 2. Finally, a vertical deflecting voltage depending on the departure of the aircraft from the glide path is applied from the discriminator 3 through the brushes 22 and 19 to the $Y_2$ plate 17, producing a corresponding shift of the horizontal trace 28 upwards, for example, as shown. When the commutator discs in Fig. 1 have rotated through a small angle in the direction of the arrows, the insulating strips move under the brushes 22, 25 and 26 thus disconnecting completely the glide path receiver 1, and connecting the approach path receiver 2 instead through the brushes 23, 24 and 27, which are now on the conducting parts of the discs. It will be seen that the new connections are similar to those described for the receiver 1 except that the discriminator 4 is now connected to the $X_2$ plate 16 and the time base circuit 6 to the $Y_2$ plate 17. Thus a vertical trace 29 is obtained on the oscillograph screen which moves sideways, for example, to the right as shown in Fig. 2, in accordance with the voltage derived from the discriminator 4, which depends on the horizontal departure from the approach path.

As the commutator discs are rotated, the cathode ray tube 9 will be connected alternately to the two receivers for equal periods of time, so that the horizontal and vertical traces will be obtained alternately. If the speed of rotation is sufficiently high (say about 25 revolutions per second) both traces will appear simultaneously on the oscillograph screen as shown in Fig. 2. Preferably the screen material should exhibit some afterglow, which will reduce the flicker effect, or the commutation period may be shortened. This period should however be long enough to include several alternations of the time base voltage, otherwise the traces will be broken up.

The oscillograph screen may be permanently marked with horizontal and vertical axes shown dotted in Fig. 2, intersecting at the centre of the screen, and these may be graduated, if desired, to indicate the departure from the course. The indication given in Fig. 2 as an example shows that the aeroplane is above, and to the right-hand side of the prescribed course, and the pilot will navigate the machine so that the two traces move into coincidence with the corresponding axes. It will be evident that the indication is easy to interpret, and there are no distracting variations in sensitivity and inclination of the indicating traces, the sensitivity being substantially the same all over the oscillograph screen.

The preferred arrangement shown in Fig. 1 assumes the use of receivers of the kind described in the specification already referred to, which have the special feature that a fault in either of them, or in the corresponding transmission, results in the disappearance of the corresponding trace, or in reducing it to a single point. In systems where the warning of a fault is given in some other way, such as by the extinction of a neon warning lamp, the arrangements according to the present invention may be simplified in the manner indicated in Fig. 3. The disc 12 with its brushes 21, 26 and 27 are no longer required, and are omitted. The blocks 30 and 31 represent the discriminators of glide path and approach path receivers of any suitable type, the output of these discriminators being in the form of a deflecting voltage, as before. The block 32 represents a time base generator of any suitable kind for producing an alternating voltage for spreading out the oscillograph spot into a straight line trace. This is connected to each of the brushes 24 and 25, and the discriminators 30 and 31 are connected respectively to the brushes 22 and 23. The oscillograph 9 is connected in the same way as before, except that the control grid 20 is permanently connected to a source 33 supplying a suitable biassing voltage.

Indications similar to those shown in Fig. 2 will be obtained on the oscillograph screen, but a fault in the system will be indicated by separate means such as the neon lamp already mentioned, and will not necessarily result in the disappearance of the trace.

The commutator discs shown in Figs. 1 and 3 are only intended to be diagrammatic, in order to show the nature of the commutation required. Any suitable type of commutator among the many well known types may be used. The commutator discs or drums or the like may be conveniently driven from the shaft of the generator usually provided in the aeroplane to supply the necessary electric power for operating the electrical equipment in the aeroplane. All this will be well understood by those skilled in the art, and it is not necessary to go into details in this specification. If desired the discs or drums could be divided into more than two alternate conducting and insulating segments.

It will be noted that each of the discs shown in Fig. 1 or 3 provides the equivalent of a periodically operated change-over connection. Accordingly, the desired commutating operations may be performed by a periodically operated relay or system of relays controlling 3 or 2 sets of change-over contacts according as the arrangement of Fig. 1 or 3 is used. Simple condenser-resistance circuits for the periodic self-interruption of a relay or pair of relays are well known, and any of these circuits giving regular commutation could be used. However the commutation frequency of such an arrangement could not, in practice, be very high without the use of expensive and delicate relays; and probably a frequency much above 10 cycles per second would not easily be obtained. If this arrangement is used, therefore afterglow in the oscillograph screen would be particularly desirable for the elimination of the flicker effect.

It will be evident that the connections between the oscillograph plates and the radio receivers through the commutator (whatever type is used) should have small time constants so that the plates may take up the changes in applied voltage quickly. As the time involved in the change-over will usually be of the order of 1 millisecond there should be no difficulty about this.

It is well known that the cathode beam may be deflected by a system of deflecting coils instead of the plates shown in Figs. 1 and 3. It will be obvious to those skilled in the art that the arrangements of Figs. 1 and 3 can be adapted without appreciable modification for deflecting the beam by means of coils or by a combination of coils and plates.

What is claimed is:

In a receiving arrangement adapted to be carried by an aircraft for use with a combined radio glidepath and approach path indicating system of the kind in which course indicating waves are radiated from ground transmitters comprising a glidepath and an approach path receiver each processing said waves to derive a respective control voltage depending on the departure of the aircraft from the corresponding path, a respective alternating voltage and also a respective bias voltage, a cathode ray tube indicator, comprising angularly disposed deflection means and a control grid, first means for simultaneously applying a control voltage to one deflection means, an alternating voltage to another deflection means and a bias voltage to said control grid from one receiver, second means for simultaneously applying a control voltage to the other deflection means, alternating voltage to said one deflection means and a bias voltage to said control grid from the other receiver, means for alternately effecting the operation of said first and second means to control the deflections of the cathode ray in such a manner as to produce alternately on the screen of the tube two line traces at right angles, the perpendicular distances of the traces from the undeflected position of the ray on the screen indicating the departure from the said glidepath and approach path respectively, and to release the cathode ray from a suppressed condition when the corresponding control voltages are applied to the tube.

HERBERT PAUL WILLIAMS.

REFERENCES CITED

The following references are of record in the file of this patent:

UNITED STATES PATENTS

| Number | Name | Date |
|---|---|---|
| Re. 22,704 | Moseley | Dec. 25, 1945 |
| 2,262,245 | Moseley et al. | Nov. 11, 1941 |
| 2,384,484 | Norden et al. | Sept. 11, 1945 |
| 2,400,232 | Hall | May 14, 1946 |
| 2,405,231 | Newhouse | Aug. 6, 1946 |